(12) United States Patent
Morgan

(10) Patent No.: US 10,452,484 B2
(45) Date of Patent: Oct. 22, 2019

(54) SYSTEMS AND METHODS FOR TIME-BASED FOLDER RESTORE

(71) Applicant: Carbonite, Inc., Boston, MA (US)

(72) Inventor: Robert Morgan, Boston, MA (US)

(73) Assignee: Carbonite, Inc., Boston, MA (US)

( * ) Notice: Subject to any disclaimer, the term of this patent is extended or adjusted under 35 U.S.C. 154(b) by 298 days.

(21) Appl. No.: 14/278,273

(22) Filed: May 15, 2014

(65) Prior Publication Data

US 2015/0331755 A1   Nov. 19, 2015

(51) Int. Cl.
*G06F 11/14*   (2006.01)
*G06F 16/22*   (2019.01)
*G06F 11/30*   (2006.01)

(52) U.S. Cl.
CPC ...... *G06F 11/1451* (2013.01); *G06F 11/1435* (2013.01); *G06F 11/1469* (2013.01); *G06F 16/2255* (2019.01); *G06F 11/3034* (2013.01); *G06F 2201/80* (2013.01); *G06F 2201/83* (2013.01); *G06F 2201/86* (2013.01)

(58) Field of Classification Search
CPC ........... G06F 17/30368; G06F 11/1451; G06F 16/2255
USPC ........................................ 707/646, 634, 679
See application file for complete search history.

(56) References Cited

U.S. PATENT DOCUMENTS

| | | | |
|---|---|---|---|
| 5,905,863 A * | 5/1999 | Knowles | H04L 51/34 709/206 |
| 6,366,930 B1 * | 4/2002 | Parker | G06F 21/565 |
| 7,747,663 B2 * | 6/2010 | Atkin | G06F 16/116 707/822 |
| 7,860,832 B2 * | 12/2010 | Midgley | G06F 11/1451 707/634 |
| 7,913,044 B1 * | 3/2011 | Desai | G06F 11/1451 711/156 |
| 8,131,782 B1 * | 3/2012 | Srinivasan | G06F 16/134 707/822 |
| 8,244,678 B1 * | 8/2012 | Hartland | H04L 67/1095 707/610 |
| 8,332,442 B1 * | 12/2012 | Greene | G06F 11/1469 707/828 |
| 9,432,192 B1 * | 8/2016 | Pogde | H04L 9/0836 |
| 2001/0037463 A1 * | 11/2001 | Salta | H04L 29/06 726/28 |

(Continued)

*Primary Examiner* — Pierre M Vital
*Assistant Examiner* — Nargis Sultana
(74) *Attorney, Agent, or Firm* — Mark Chadurjian, Esq.; Gibb & Riley, LLC

(57) ABSTRACT

The present disclosure describes systems and methods for hierarchical, iterative backup and restoration of files in a hierarchy. Upon backup of a new or modified file, an identification file is created with entries identifying the new or modified file and current versions of all other files in the same directory. The identification file may be stored on the local system and marked for backup. This triggers standard backup routines, such that the identification file is then backed up as if it were a new file in the parent directory. Accordingly, a second identification file is created with entries identifying the first identification file (and thus the child directory) as well as any other current versions of files in the parent directory and identification files for other child directories. This process is iteratively repeated, climbing through the directory structure, until reaching a top-most or root folder.

17 Claims, 10 Drawing Sheets

(56) References Cited

U.S. PATENT DOCUMENTS

| | | | |
|---|---|---|---|
| 2002/0019827 A1* | 2/2002 | Shiman | G06F 21/6218 |
| 2002/0095416 A1* | 7/2002 | Schwols | G06F 16/10 |
| 2002/0099719 A1* | 7/2002 | Schwitters | G06Q 10/107 |
| 2003/0009484 A1* | 1/2003 | Hamanaka | G06F 16/10 |
| 2005/0216788 A1* | 9/2005 | Mani-Meitav | G06F 11/1456 714/6.32 |
| 2006/0036568 A1* | 2/2006 | Moore | G06F 16/168 |
| 2007/0094312 A1* | 4/2007 | Sim-Tang | G06F 16/125 |
| 2007/0186127 A1* | 8/2007 | Desai | G06F 11/1448 714/13 |
| 2007/0271278 A1* | 11/2007 | Acharya | G06K 9/6219 |
| 2008/0034016 A1* | 2/2008 | Cisler | G06F 11/1466 |
| 2008/0126442 A1* | 5/2008 | Cisler | G06F 11/1458 |
| 2009/0198744 A1* | 8/2009 | Nakamura | G06F 16/1734 |
| 2009/0240737 A1* | 9/2009 | Hardisty | G06F 16/10 |
| 2010/0125794 A1* | 5/2010 | Hampton | G06F 16/168 715/716 |
| 2010/0146017 A1* | 6/2010 | Itoh | G06F 16/164 707/812 |
| 2010/0325377 A1* | 12/2010 | Lango | G06F 16/10 711/162 |
| 2012/0089572 A1* | 4/2012 | Raichstein | G06F 16/174 707/645 |
| 2012/0143825 A1* | 6/2012 | Boehm | G06F 11/1451 707/648 |
| 2012/0143827 A1* | 6/2012 | Brown | G06F 11/1458 707/654 |
| 2012/0143830 A1* | 6/2012 | Cormode | G06F 16/24568 707/687 |
| 2012/0317077 A1* | 12/2012 | Chung | G06F 16/178 707/634 |
| 2013/0036095 A1* | 2/2013 | Titchener | G06F 11/1451 707/654 |
| 2013/0066839 A1* | 3/2013 | Westwood | G06F 11/1464 707/679 |
| 2013/0110790 A1* | 5/2013 | Matsumoto | G06F 12/00 707/679 |
| 2013/0246365 A1* | 9/2013 | Hornkvist | G06F 11/1448 707/651 |
| 2013/0325902 A1* | 12/2013 | Bachar | G06F 16/9027 707/797 |
| 2014/0195485 A1* | 7/2014 | Dorman | G06F 16/1734 707/624 |
| 2014/0229760 A1* | 8/2014 | Gladwin | G06F 12/1425 714/6.2 |
| 2015/0324414 A1* | 11/2015 | Noguchi | G11B 27/34 707/690 |
| 2015/0331755 A1* | 11/2015 | Morgan | G06F 11/1451 707/646 |
| 2015/0378834 A1* | 12/2015 | Bachu | G06F 16/17 707/646 |

* cited by examiner

SYSTEMS AND METHODS FOR TIME-BASED FOLDER RESTORE

FIELD

The present application relates to systems and methods for backup and restore of previous version of files and folders.

BACKGROUND

Traditional backup systems, such as remote backup systems, typically back up one or more files on a storage device of a client system or the entire storage device to a remote storage device maintained by the backup provider. Backups may be performed manually, on a periodic schedule, or in response to changes to files. In some implementations, only present versions of files are backed up, while in other implementations, one or more prior versions of files are maintained. These latter systems allow a user to recover an older version of a file, effectively undoing any edits to the file.

In many backup systems, a user may elect to either restore an entire storage device to a previously backed-up state, or may select individual files to restore. This may be tedious, particularly if a user wishes to restore a large number of files but not revert the entire storage device to a prior state.

Efforts to address this deficiency and allow a user to restore groups of files have typically required rewriting backup software implementations or building entirely new backup systems that provide the necessary functionality, albeit at reduced storage or bandwidth efficiency. For example, one such implementation is the Time Machine® backup software application by Apple Inc. of Cupertino, Calif. Time Machine® creates periodic backups of files and folders by creating folders for each periodic backup, the folder containing any changed files and hard links to earlier, unchanged files and folders. These links and directory structures are stored on the backup device, either a second local storage device or a network storage device. As a result, data connections between the backup device and the client device must be at high speed, such as serial connections or via a high-speed local area network (LAN), to allow a user to browse through the past backups for files or folders to restore. Furthermore, Time Machine® backups utilize sparse bundle images that may not allow for efficient cross-bundle de-duplication and compression algorithms, increasing the amount of storage and network bandwidth required to back up client data. Additionally, while such images may be encrypted, because the backed up directory and file structure is stored within the image, the encrypted image must be transferred to the client device and decrypted before a user may select which file or files to restore. Accordingly, such implementations may not work with remote backup systems over a wide area network (WAN) such as the Internet.

SUMMARY

The present disclosure describes systems and methods for remote backup over a network, including encryption, versioning of files, and easy restore of folders and sub-folders. To provide restoration of files in a hierarchy, in one implementation, upon backup of a new or modified file, an identification file, such as a text file or other data file, is created with entries identifying the new or modified file and current versions of all other files in the same directory. The identification file may be stored on the local system and marked for backup. This triggers standard backup routines, such that the identification file is then backed up as if it were a new file in the parent directory. Accordingly, a second identification file is created with entries identifying the first identification file (and thus the child directory) as well as any other current versions of files in the parent directory and identification files for other child directories. This process is iteratively repeated, climbing through the directory structure, until reaching a top-most or root folder.

To restore a folder and any subfolders to a state at a prior time, a backup manager on the client device retrieves the identification file for the folder that was created at the prior time. That identification file identifies the then-current versions of files in that folder, as well as additional identification files identifying then-current versions of child folders which may be retrieved to identify then-current versions of files in the subfolders. This process is iteratively repeated, climbing down through the directory structure, until no more subfolders are found.

To prune old versions of files (e.g. after a predetermined time period or in response to a command from a user), the expired or old version of the file may be deleted from backup storage. Responsive to the deletion, any identification file identifying the old version of the file may also be deleted, including any identification file on the client, such as one in the parent directory of the deleted version of the file. This client-side deletion triggers an update of the parent directory, as its contents have been modified with deletion of the identification file. This process may be iteratively repeated, climbing up the directory structure to a top-most or root level, deleting all identification files referring to the deleted file or identifying a version of a folder including an identification file referencing the deleted file or another such identification file.

Accordingly, because versioning and directory structure is maintained on the client, network bandwidth is not required for the user to browse through older versions of files or folders to select data to restore. Similarly, files may be encrypted at the remote storage device, and need not be transferred and decrypted simply so that the user may determine if they wish to restore the files.

In one aspect, the present disclosure is directed to a method for tree-based remote incremental backup tracking. The method includes (a) detecting, by a backup manager executed by a local device, a new or modified file in a first folder of the local device; and (b) transmitting, to a remote device by the backup manager, the detected file for backup by the remote device, responsive to the detection. The method also includes (c) generating, by the backup manager, an identification file identifying the detected file, the identification file associated with a parent folder of the first folder; and (d) transmitting, to the remote device by the backup manager, the generated identification file for backup by the remote device. The method further includes (e) iteratively repeating steps (a)-(d) for each successive parent folder up to a designated folder of the local device.

In some embodiments of the method, the designated folder of the local computing device is a root folder. In other embodiments, the method includes calculating a hash value of the detected file, and storing the hash value in the identification file. In still other embodiments of the method, the identification of the modified file comprises an identification of a current version of the modified file. In still yet other embodiments of the method, the identification file is associated with the parent folder of the first folder as external metadata of the folder. In yet still other embodiments of the method, the identification file is stored in the parent folder of the first folder.

In another aspect, the present disclosure is directed to a method for restoring from a tree-based remote incremental backup. The method includes retrieving, by a backup manager executed by a local device, responsive to a selection of a first folder for restoration to an indicated time, a first identification file associated with the first folder, the first identification file identifying a version of a first file stored in the first folder at the indicated time. The method also includes reading, by the backup manager from the first identification file, the identification of the version of the first file; and retrieving, by the backup manager based on the identification, the version of the first file.

In some embodiments of the method, the first file comprises a user data file. In other embodiments, the first file includes a second identification file associated with a child folder of the first folder, the second identification file identifying a version of a second file stored in the child folder at the indicated time. In a further embodiment, the method includes reading, by the backup manager from the second identification file, the identification of the version of the second file; and retrieving, by the backup manager based on the identification of the version of the second file, the version of the second file for storage in the child folder of the first folder.

In still another aspect, the present disclosure is directed to a method for maintaining a tree-based remote incremental backup tracking system. The method includes (a) receiving, by a backup manager executed by a local device, an identification of deletion of a version of a backed up file having a first modification time from a first folder; and (b) retrieving, by the backup manager, at least one identification file associated with a corresponding at least one version of the first folder, each of the at least one identification files identifying contents of the corresponding version of the first folder at a time in a range from the first modification time to a current time. The method also includes (c) identifying, by the backup manager, a subset of the at least one identification files including an identification of the version of the backed up file having the first modification time; and (d) deleting, by the backup manager, the identified subset of the at least one identification files.

In some embodiments, the method includes (e) iterating steps (a)-(d) for each deleted identification file of the identified subset of the at least one identification files as the version of a backed up file. In other embodiments of the method, each at least one identification file is stored in a folder corresponding to a version of a parent folder of the first folder. In still other embodiments, the method includes calculating a hash of contents of the version of the backed up file having the first modification time; and identifying at least one of the identification files including the hash result.

In yet still another aspect, the present disclosure is directed to a system for tree-based remote incremental backup tracking. The system includes a local device comprising a processor and a memory storing a file system. The processor executes a backup manager configured to (a) detect a new or modified file in a first folder of the file system of the local device; and (b) transmit, to a remote device, the detected file for backup by the remote device, responsive to the detection. The backup manager is also configured to (c) generate an identification file identifying the detected file, the identification file associated with a parent folder of the first folder in the file system of the local device; (d) transmit, to the remote device, the generated identification file for backup by the remote device; and (e) iteratively repeat steps (a)-(d) for each successive parent folder up to a designated folder of the local device.

In one embodiment of the system, the designated folder of the local computing device is a root folder. In another embodiment of the system, the backup manager is configured to calculate a hash value of the detected file, and store the hash value in the identification file. In still another embodiment of the system, the identification of the modified file comprises an identification of a current version of the modified file. In yet still another embodiment of the system, the identification file is associated with the parent folder of the first folder as external metadata of the folder. In still another embodiment of the system, the identification file is stored in the parent folder of the first folder.

BRIEF DESCRIPTION OF THE FIGURES

In the drawings, like reference numbers generally indicate identical, functionally similar, and/or structurally similar elements.

DETAILED DESCRIPTION

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Figure 1A:
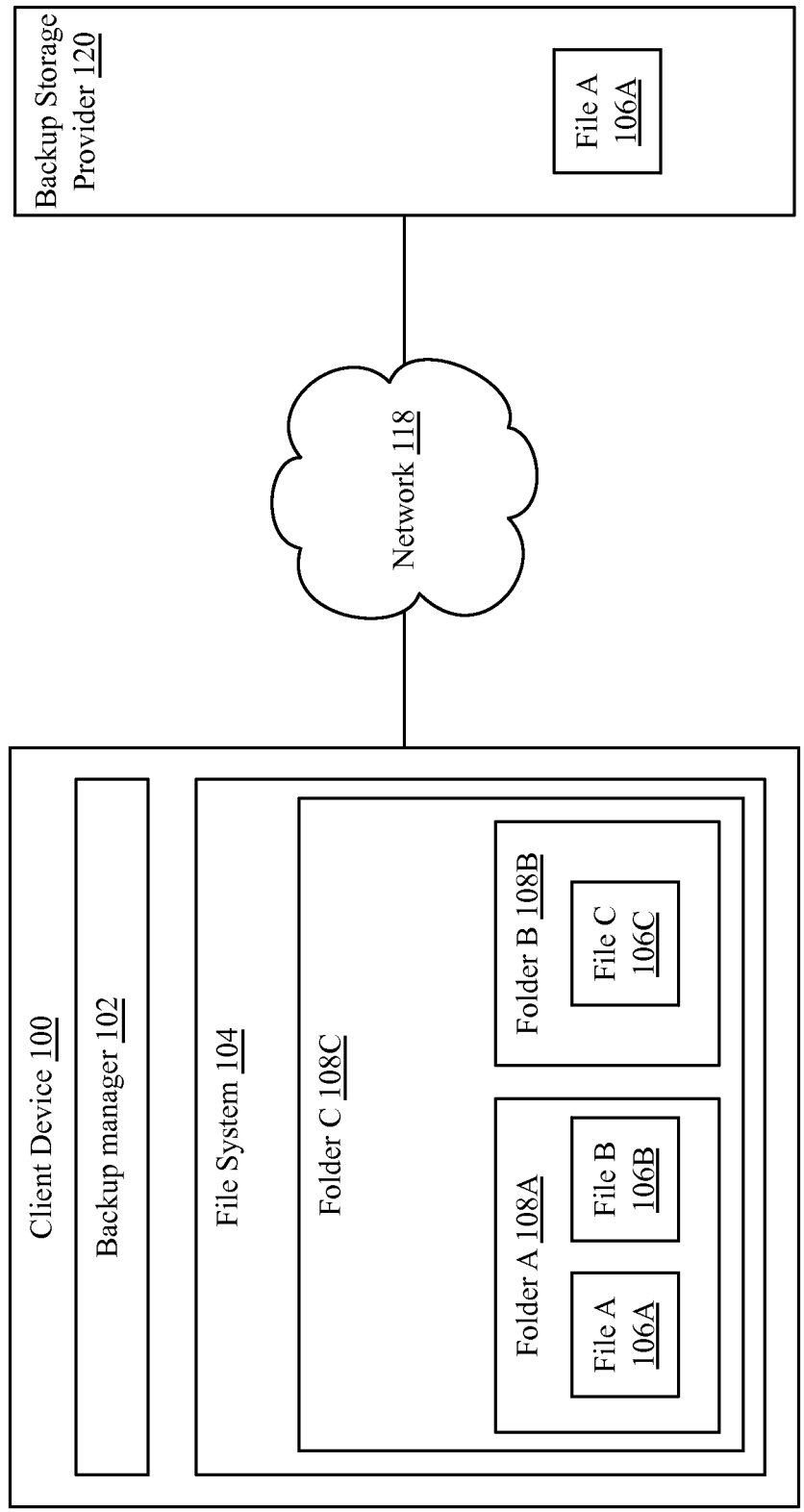
FIG. 1A is a block diagram of an embodiment of a remote backup system in an exemplary first state.

FIG. 1A illustrates a block diagram of an embodiment of a remote backup system in an exemplary first state. As shown, a client device 100 may connect via a network 118 to a backup storage provider 120. Client device 100 may comprise any type and form of computing device, such as a desktop computer, laptop computer, workstation, server, portable computer, tablet computer, smart phone, wearable computer, or any other type and form of computing device. A client device 100 may be referred to variously as a client, local device, user device, subscriber device, device operating on behalf of a user or backup subscriber, or any other such term.

A client device 100 may include a backup manager 102. Backup manager 102 may comprise an application, applet, service, server, daemon, routine, or other executable logic for monitoring changes to files and/or folders in storage of the client device 100 and for transferring data to and from a backup storage provider 120. Backup manager 102 may be referred to as a backup manager, client manager, client agent, client-side manager, backup application, file monitor, or any other such description. In some implementations, backup manager 102 may run in a user mode, kernel mode, or combination of user mode and kernel mode. For example, backup manager 102 may include a user interface for allowing a user to select files and/or folders for backup, select files and/or folders to be excluded from backup, select files and/or folders to be restored and select a prior time or version at which to restore the files to, or any other such selections. Backup manager 102 may also include a file monitor or system agent monitoring file writes or other system events indicating creation, modification, and/or deletion of files. In some implementations, the user interface may run in a user mode and the file monitor may run in a kernel mode. In other implementations, these functions may be executed solely in a user mode or kernel mode.

Backup manager 102 may monitor a file system 104 on the client device 100. File system 104 may comprise any type and form of file system, including a file allocation table (FAT) file system, an extended FAT (exFAT) file system, a hierarchical file system (HFS), a new technology file system (NTFS), or any other type of file system. File system 104 may support journaling, encryption, online defragmentation, or any other such features. File system 104 may be provided or maintained by an operating system of the client device 100. In some implementations, the file system may be accessible by a user or a user may be able to create, move, or delete folders or files directly, while in other implementations, the file system may be primarily inaccessible to users. For example, many smart phone or tablet devices include a file system for storage of applications and data, but do not allow a user access to the directory structure without specialized tools or applications.

File system 104 may include a hierarchical directory structure comprising a plurality of nested folders 108, sometimes referred to as directories, subdirectories, subfolders, or by any other such term. Folders 108 may have parent-child relationships to other folders 108 in the hierarchy, with a top-level or root folder and one or more child folders 108, each of which may have further child folders 108, etc. In the exemplary embodiment shown in FIG. 1A, a first folder C 108C has two child folders, folder A 108A and folder B 108B. Folder A 108A contains two files, file A 106A and file B 106B. Folder B 108B contains a third file, file C 106C. Files 106A-106C, referred to generally as file(s) 106 may comprise any type and form of data, including text, images, sounds, multimedia, executable code, database files, applications, or any other type and form of data.

As discussed above, a client device 100 may communicate via a network 118 with a backup storage provider 120. Although only one client device 100 and one backup storage provider 120 is illustrated, in many implementations, a plurality of client devices 100 may communicate with a plurality of backup storage providers 120. Such client device 100 may be of the same or different types, including desktop computers, laptop computers, smartphones, etc. as discussed above. Similarly, backup storage provider 120 may comprise a plurality of devices, such as an array, farm, or cloud of servers; a plurality of virtual machines executed by one or more physical machines; a load balancer or gateway and plurality of machines; one or more storage devices; or any other type and form of computing system. Backup storage provider 120 may be referred to as a storage provider or storage service provider; online, remote, or cloud backup service; or by any other such term.

Network 118 may comprise any type and form of network or networks, including a LAN and/or WAN such as the Internet. For example, although only one network is illustrated, in many implementations, a client device 100 may connect to a first LAN, which may connect to the Internet, which may further connect to a second LAN connected to the backup storage provider 120. Accordingly, network 118 may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

As discussed above, files 106A-106C may be stored in folders 108A-108C on a client device 100. Files 106 may also be backed up in storage of the backup storage provider 120. For example, as shown in FIG. 1A, a first file A 106A may be transferred to and stored by a backup storage provider 120. Other files and folders may also be stored by backup storage provider.

Figure 1B:
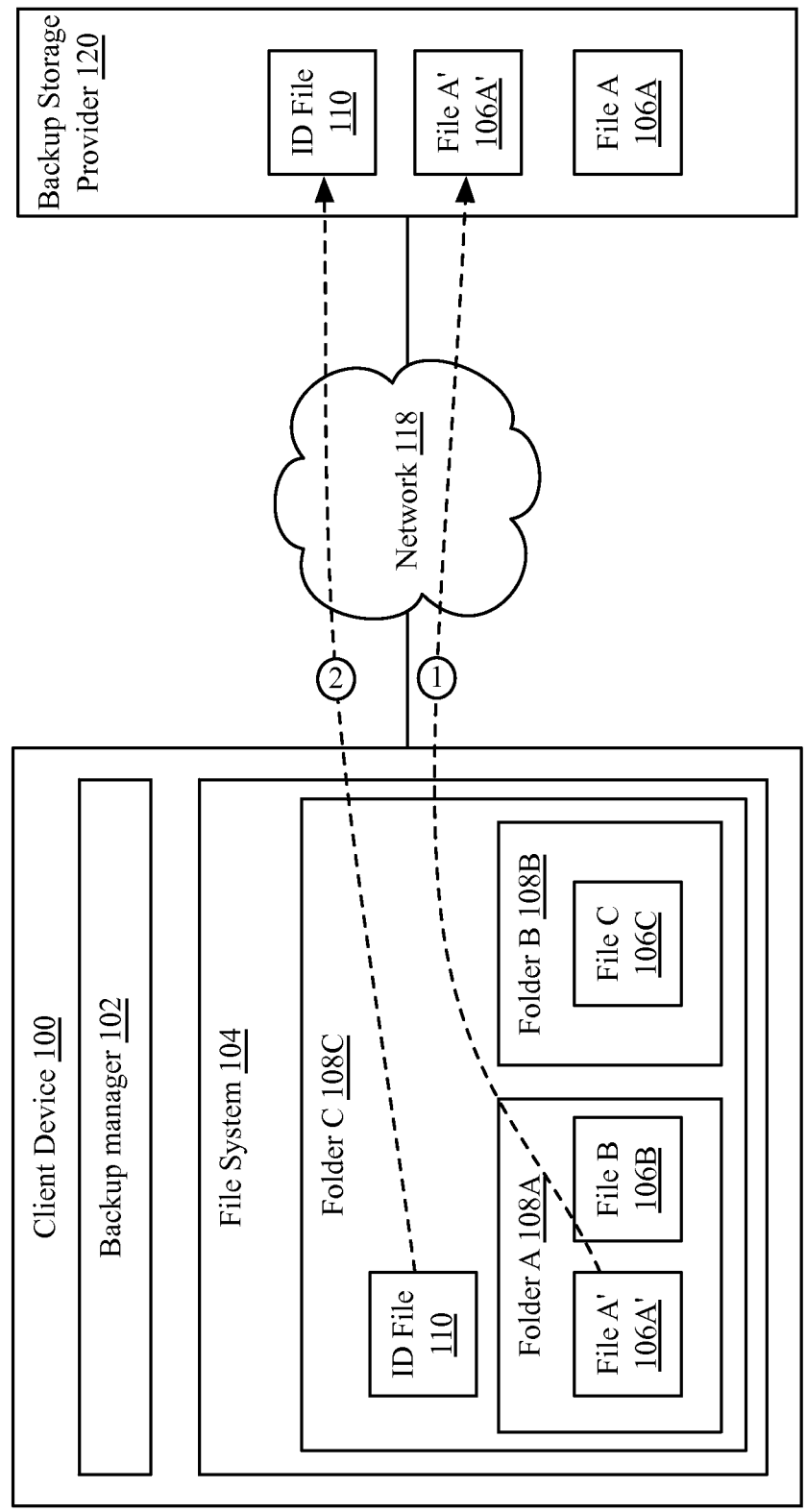
FIG. 1B is another block diagram of the embodiment of the remote backup system of FIG. 1A, showing steps of transition to an exemplary second state.

FIG. 1B illustrates steps of transition to an exemplary second state of the embodiment of the system of FIG. 1A following modification of a file. A first file A 106A may be modified by a user, resulting in file A' 106A'. For example, the file may be a text document and the user may have edited the document. The backup manager 102 may monitor the file system for changes and/or monitor system events or disk writes to detect the change to the file. Upon detecting the modification, the backup manager 102 may direct transfer of the modified file A' 106A' to the backup storage provider 120 at step 1. The modified file 106A' may be stored by the backup storage provider 120 in addition to the prior version 106A, as shown.

Also responsive to detecting the modification to file A in folder A 108A, the backup manager 102 may generate an identification file 110 and store the identification file 110 in the parent folder of folder A, folder C 108C as shown. The identification file 110, discussed in more detail below in connection with FIG. 3, may comprise an identification of the contents of the child folders of the folder containing the identification file, e.g. folder A and folder B in the example shown, at the time of creation of the identification file. Accordingly, the identification file may comprise a "snapshot" or record of the files 106, 106' in the child folders and their versions at a particular point in time. In many implementations, the identification file 110 may be a hidden file, not visible to a user. In other implementations, the identification file 110 may be stored in a virtual or hidden directory corresponding to Folder C 108C. For example, in one such implementation, the file system 104 may include a plurality of hidden folders 108' corresponding to user-accessible folders 108 and having the same hierarchical relationship to each other as the user-accessible folders 108. Identification files 110 may be stored in the hidden folders 108' rather than the user-accessible folders, reducing the possibility of inadvertent deletion or modification by a user.

Generating and storing the identification file 110 in the parent folder, e.g. folder C 108C, results in a modification to the file system 104. Utilizing the same process discussed above, the backup manager 102 may identify the modification and back up the identification file 110 to the backup storage provider 120 at step 2. In some implementations, the backup manager 102 may then create and store another identification file in a parent folder (not illustrated) of the folder containing the first identification file. This process may iteratively repeat until reaching a root directory of the file system 104, such an identification file is created in the parent folder of the modified file 106, said parent folder's parent folder or a "grandparent" folder, said grandparent folder's parent folder or a "great-grandparent" folder, etc.

Figure 1C:
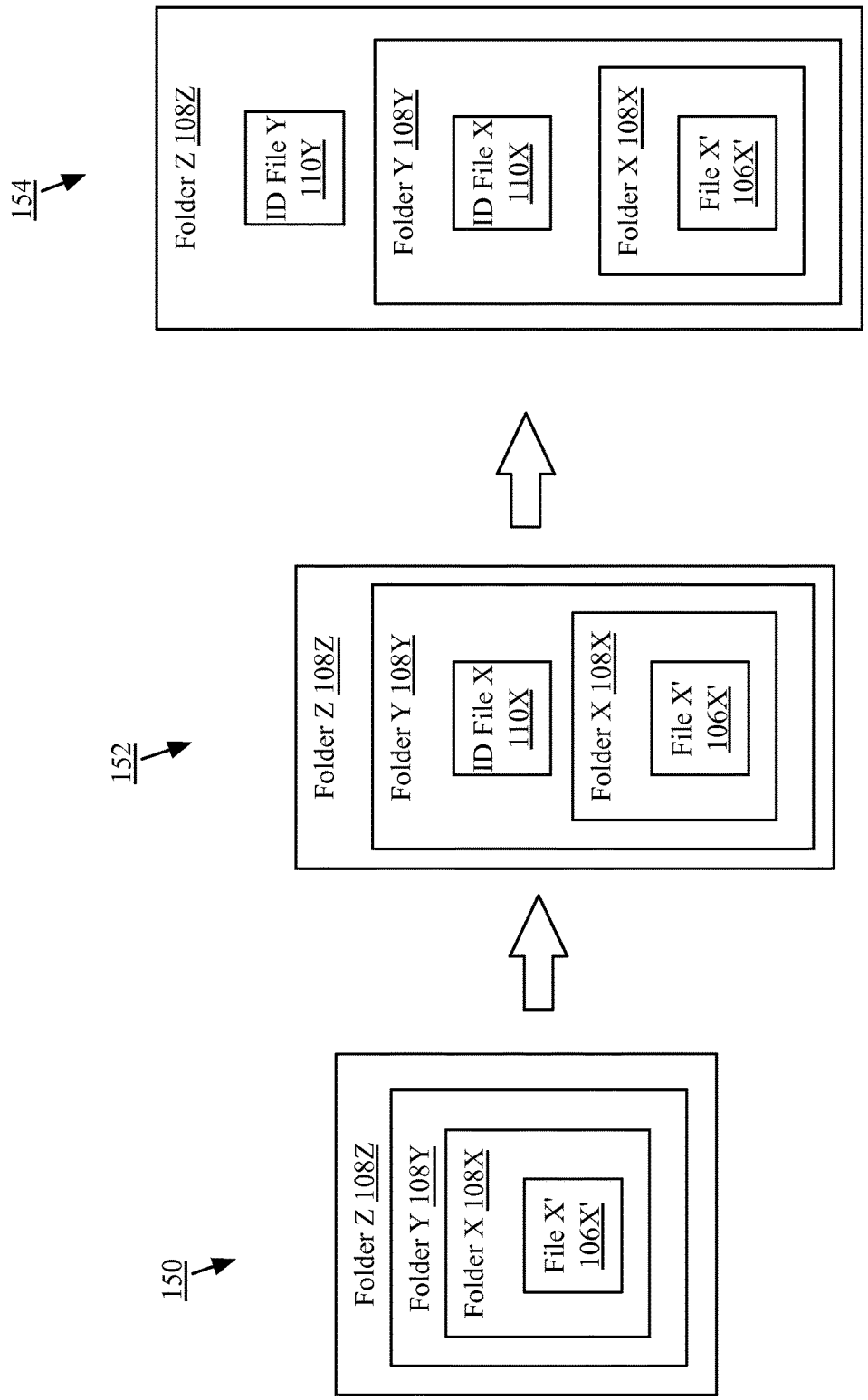
FIG. 1C is a diagram illustrating three exemplary states of a directory during an embodiment of an iterative backup process.

This process is further illustrated in the exemplary diagrams of states of a file system of FIG. 1C. As shown in a first state 150, a folder X 108X may include a file that has been modified, file X' 106X'. After generation of the identification file X 110X in the parent folder of folder X, folder Y 108Y, the system is in state 152. This causes backup of the identification file 110X and creation of the second identification file Y 110Y in the parent directory of file 110X, folder Z 108Z, resulting in state 154. Each folder 108 may further include other files 106 and folder 108, not illustrated.

Figure 2:
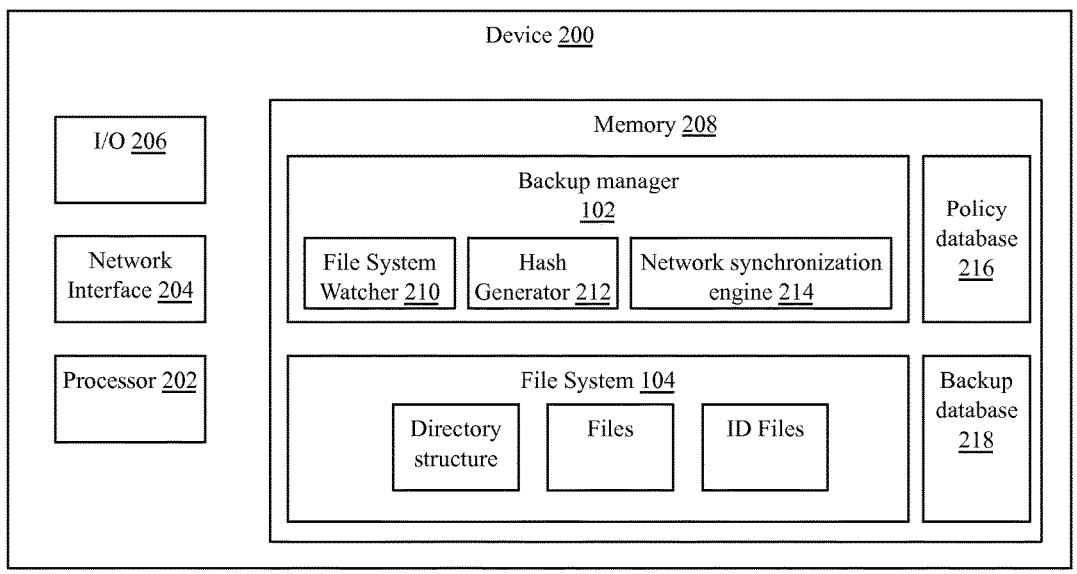
FIG. 2 is a block diagram of an embodiment of a device for remote backup.

FIG. 2 is a block diagram of an embodiment of a device 200 for remote backup. Device 200 may comprise a client device 100 or a backup storage provider device 120. In some implementations, device 200 may not include all of elements 202-218 illustrated, or may include a plurality of any of elements 202-218 or other elements. For example, in one implementation, a device 200 may comprise a plurality of network interfaces 204. Furthermore, although illustrated as a single device, in many implementations as discussed above, a backup storage provider 120 may comprise a plurality of devices 200 in communication via a network, such as a server and a plurality of storage devices, a plurality of load balanced servers, or any other combination of these or other devices. In some implementations, a device 200 may comprise a virtual device or virtual machine, executed by a physical machine.

A device 200 may include one or more processors 202. A processor 202 may comprise a central processing unit (CPU), microprocessor, application-specific instruction-set (ASIC) processor, or any other type and form of processor for executing a backup manager 102, and/or maintaining a file system 104. A processor 202 may communicate with one or more network interfaces 204, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 204 may be used for transmitting and receiving files for backup or restoration between a client device 100 and a backup storage provider 120, for remote configuration of backup policies, for updating a backup manager 102, or any other such functions.

A device 200 may comprise one or more input/output interfaces 206. An input or output interface 206 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface.

A device 200 may comprise one or more memory devices 208. Memory 208 may comprise any type and form of memory or storage, including random access memory (RAM), hard drive storage, solid state drive storage, flash memory, optical or magneto-optical storage, tape storage, or any other type and form of storage device. As discussed above, in some implementations, memory 208 may include a user-accessible file system 104, while in other implementations, the file system 104 may not be user-accessible without specialized tools or applications. The file system 104 may include a directory structure or tree; one or more files, including original files, modified files, and/or backed up versions of original or modified files; and/or identification files.

Memory 208 may also include a backup manager 102 as discussed above. In some implementations, a backup manager 102 may include a file system watcher 210. A file system watcher 210 may comprise a service, daemon, routine, or other executable logic for monitoring, hooking, or intercepting commands to an application programming interface (API) or otherwise monitoring operations of a file system 104. For example, on a device utilizing a Microsoft Windows operating system, the file system watcher 210 may monitor FileSystemWatcher events updated by the operating system to detect files that are created, changed, deleted, renamed, moved, or otherwise accessed. Similarly, on a device utilizing an Apple Macintosh OSX operating system, the file system watcher 210 may utilize the FSEvents API or monitor an FSEvents log. Implementations on other operating systems may monitor similar processes or logs, or may perform periodic scans of one or more folders or libraries to detect changes to metadata or contents of files within the folder or library. In some embodiments, the file system watcher 210 may be configured to monitor all file operations on a device, on a specified drive, or in a folder or folders. Such configuration information may be stored in a policy database 216, discussed in more detail below.

Upon detecting a modification to a file, in some implementations, a hash may be calculated or similar identifier generated for the modified file by a hash generator 212. Hash generator 212 may comprise an application, service, daemon, routine, or other executable logic for calculating a hash, checksum, or other identifier of a file. For example, in one implementation, hash generator 212 may comprise a secure hash algorithm (SHA) calculator, such as a SHA1 algorithm. Because the hash of a file is based on the contents of the file, a modified version of a file may have a different hash value than an earlier version of the file; accordingly, the hash value may be used to identify a version of a file. Hashes may be stored in identification files, as discussed below in connection with FIG. 3. Similarly, in some implementations, hash generator 212 may calculate a hash of the contents of an identification file. In some implementations, the resulting hash value of the contents of the identification file may be used as an identifier for the identification file, such as a file name or path for the identification file.

Memory 208 may also include a network synchronization engine 214. A synchronization engine 214 may comprise an application, service, server, daemon, or other executable logic for transmitting files to or retrieving files from a remote device, and/or for communicating with an online storage provider. Network synchronization module 214 may transmit periodic updates of recently modified files on the device 200, and/or periodically request updates of recently modified files on other devices or on the online storage provider. In some embodiments, network synchronization module 214 may request and receive modified or newly created files, while in other embodiments, network synchronization module 214 may first receive metadata for modified or newly created files and determine, based on a policy or responsive to a request by a user, whether to retrieve the file from the remote device or online storage provider. In some implementations, network synchronization engine 214 may execute traffic shaping or load balancing algorithms to reduce network bandwidth requirements during backup of files, or may perform one or more acceleration techniques, including compression, connection pooling and/or multiplexing, transport layer buffering, congestion avoidance algorithms, or any other type and form of acceleration technique. In some implementations, network synchronization engine 214 may perform encryption and decryption of data being transferred between a client device and a backup storage provider device.

In some implementations, memory 208 may include a policy database 216. Policy database 216 may comprise a data file, array, flat file, or other data structure for configuring one or more backup, synchronization, restoration, or storage policies. For example, policy database 216 may include identifications of folders not to be monitored by file system watcher 210 or identifications of file types, names, locations, sizes, or other such information that should be excluded from backup operations. In other implementations, policy database 216 may identify a number of versions of backed up files to maintain at a backup storage provider, such as up to five prior versions; or may identify a time span of backed up versions of files to maintain, such as one version per hour, one version per week, one version per month, etc. In some implementations, backup policies may be multi-level: for example, the policy may indicate that prior versions of a file should be maintained on an hourly basis for 24 hours, then on a daily basis for a week, and then on a monthly basis for three months. In other implementations, any combination of these or other values or intervals may be used.

In some implementations, memory 208 may include a backup database 218. A backup database 218 may comprise a database, data array, flat file, or other data structure for storing identifications of backed up files, directories, and/or identifier files, and for associating these identifications with each other or with other identifiers, such as user, account, and/or device identifiers. For example, in many implementations, a device of a backup storage provider 120 may maintain a backup database 218 identifying storage locations on a plurality of storage devices at which backed up files belonging to specified users or devices are stored. In some implementations, particularly where backed up files are encrypted, the backup database 218 may include only such location identification and may not include metadata of the files. As identification files may be maintained on the client device, the client may be able to request restoration of specific files by storage location without having to provide metadata to the backup storage provider, increasing privacy and security.

Figure 3:
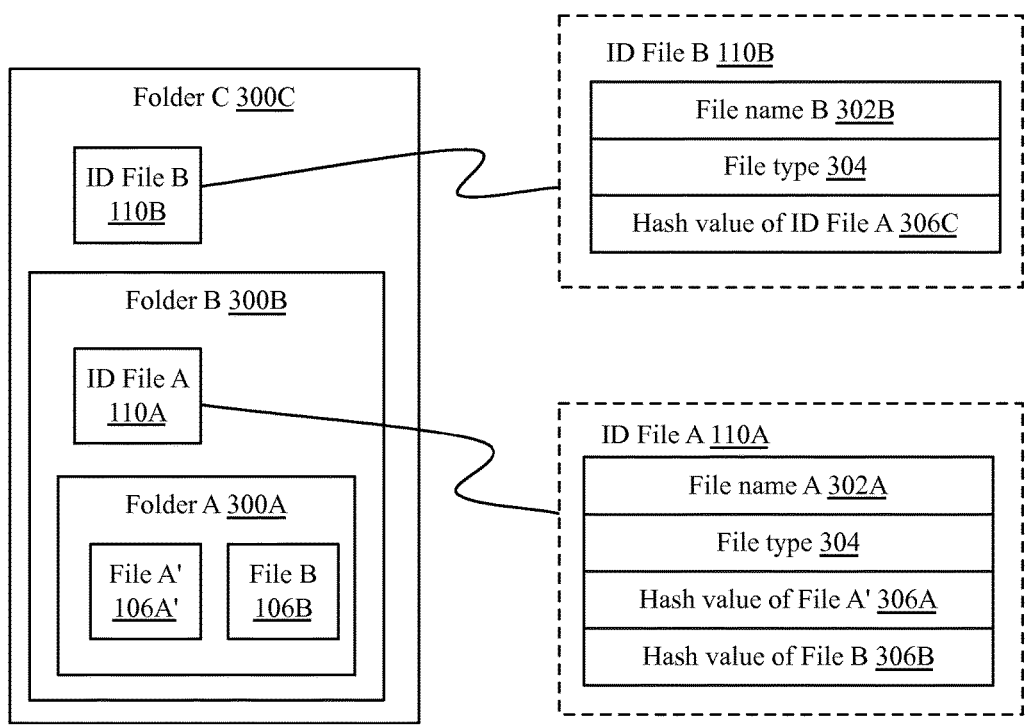
FIG. 3 is a diagram of an embodiment of an identification file structure for iterative backup.

FIG. 3 is a diagram of an embodiment of an identification file structure for iterative backup. As shown on the left, an exemplary file system of a client device 100 may include a first folder 300A, with a parent folder 300B, and a grandparent or root folder 300C. The first folder 300A may include files 106A-106B. As discussed above in connection with FIGS. 1A-1C, on modification of a first file (e.g. file A' 106A'), a first identification file 110A may be generated and stored in folder 300B, the parent folder of the folder storing the modified file, folder 300A. Identification file 110A may comprise a text file, flat file, data array, or any other type and form of data structure for storing information about the present contents of a folder, such as folder A 300A.

In one implementation, the identification file 110A may comprise a set of hash values calculated by a hash generator for the present version of each file stored in the folder, e.g. the hash value of File A' 306A, and the hash value of file B 306B. Identification files 110 may be of variable length, and may include hash values for every file within the folder. As the identification files 110 may be simple text files or in a similar lightweight format, in many embodiments, the files 110 may be of very small size.

In some implementations, the identification file 110A may include a file type identifier 304, which may indicate that the identification file 110A is an identification file, as opposed to some other user data file. For example, in one embodiment, the file type identifier 304 may indicate that the identification file 110A is external metadata of the child folder. The file type identifier 304 may be stored in metadata of the identification file, in a first or last string within the identification file, or in any other position. For example, in one implementation, the file type identifier may comprise a predetermined string utilized as a portion of a file name, e.g. "IDFile_nnnnnnn".

In some implementations, the identification file may include a file name 302, which may comprise a hash value of a hash calculation on the contents of the identification file. For example, the identification file may be generated by concatenating hash values of the files in the a folder. The resulting identification file may be hashed, and the hash result may be used as a name of the identification file. In other implementations, the identification file may have a file name based on a time and/or date of creation.

After generation of the first identification file 110A, the backup manager may determine that folder B's contents have changed, and may transmit the new identification file 110A to a backup storage provider. In a similar process to those discussed above, the backup manager may generate a second identification file 110B to be stored in the parent folder of the now-modified folder B, folder C 300C. In the example embodiment shown, the second identification file 110B may include the hash values of the versions of the files contained in folder B, e.g. the hash value 306C of identification file A 110A.

In embodiments in which the hash value of the identification file 110 is used as the name of the identification file, identification files in higher level directories will include the file names of identification files in child directories, resulting in an explicit pointer that may be followed to identify the contents of child directories. For example, in such implementations, identification file B 110B includes the file name of identification file A 110A. During restoration of a folder and its subfolders to a prior state, the backup manager may retrieve the corresponding identification file of the selected folder; may retrieve any identified files 106; and may retrieve any identified identification files 110 for child directories. The backup manager may then retrieve any identified files in the child identification files, and any further identified identification files to restore the contents of the child directory and any further grandchild directories. This process may be iteratively repeated to retrieve the contents of any folder and all of its descendent folders at any specified point in time.

Although shown in folders 300B-300C, in many implementations, identification files 110 may be stored in separate folders, such as hidden folders or backup system folders corresponding to folders 300B-300C. In other implementations, identification files 110 may be stored within folders 300B-300C but be hidden or invisible to the user. In one implementation in which hash values of identification files are used as their file names, content addressing may be utilized to increase storage efficiency: one or more characters of the file name may be used to create subdirectories, into which all identification files beginning with the same one or more characters are stored.

Figure 4A:
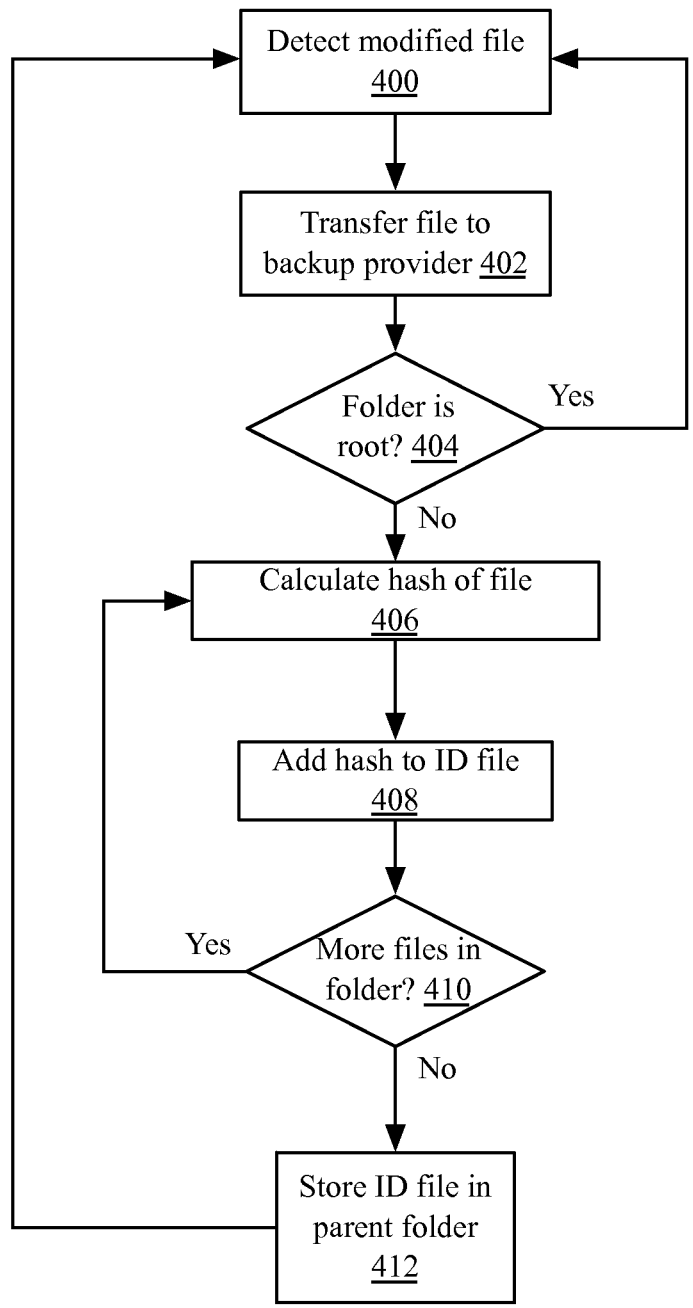
FIG. 4A is a flow diagram of an embodiment of a method for iterative backup of files and folders.

FIG. 4A is a flow diagram of an embodiment of a method for iterative backup of files and folders. The method may be referred to variously as an iterative backup process, an incremental backup tracking process, a tree-based or hierarchical backup process, or by any other similar names. In many implementations, the method may be added to existing remote backup systems that monitor file systems for modified files and back up any detected modified files, by implementing hash calculations or other file version-specific identifiers and identification file generation systems as discussed above.

At step 400, a backup manager or file system watcher of a backup manager may detect a modified file. The modification may comprise creation of a new file, modification of a file, deletion of a file, duplication of a file, or any other such modifications. The modification may be detected via monitoring of system events, monitoring of disk writes, periodic scanning and comparison of folder contents to previous listings, or any other such methods.

At step 402, the backup manager may transfer the modified file to a backup storage provider. In some implementations, such as where a file is created or modified, the backup manager may transmit the detected file for backup to the backup storage provider. In other implementations, such as where a file is deleted, the backup manager may transmit an indication of deletion of the file to the backup storage provider. Although illustrated after step 400, in some implementations, step 402 may be performed at any other point during the method, or in parallel to execution of other steps.

At step 404, in some implementations, the backup manager may determine whether the modified file is in a root folder or top-most directory of a file system. If so, then in some implementations, the backup manager may take no further action. This may be done because, in some implementations, the identification files may not be stored in any higher directory level than the root folder. In other implementations not illustrated, the backup manager may still create a special or root identification file to identify modified files in the root folder of the file system, or may store the identification file in a "higher than root" virtual directory or hidden directory that is designated to contain identification files corresponding to the root directory. In such implementations, step 404 may be skipped.

At step 406, in some implementations, the backup manager or a hash generator may calculate a hash value of the modified file. As discussed above, the hash value may comprise a SHA hash value, or may be the result of any other type and form of hash function, such as a cryptographic hash function. The hash value may be calculated based on the contents of the file, the metadata of the file, or a combination of the contents and metadata of the file. In some implementations, only a portion of the contents may be used as an input to the hash function. For example, in one implementation, an initial portion of the file contents and the modification time in the metadata of the file may be concatenated and used as the input to the hash function.

At step 408, the calculated hash value may be added to the contents of an identification file. In a first iteration of step 408, the backup manager may create an identification file and add the calculated hash value to the file. In other iterations, the backup manager may append the calculated hash value to the existing identification file. In some implementations, other information may be added to the identification file, including file names, modification and/or creation times, sizes, storage locations, user identifiers, or other such metadata.

At step 410, the backup manager may determine if other files exist in the folder. If so, then steps 406-408 may be repeated for each other file. As discussed above, hash values calculated from each other file may be appended to the identification file, along with other metadata in some implementations.

If no other files exist in the folder, or once steps 406-408 have been repeated for each file in the folder, then at step 412, in some implementations, the generated identification file may be stored in the parent folder of the folder containing the modified file. In other implementations, the generated identification file may be stored in a file associated with the parent folder, such as a hidden directory, content addressed directory structure, or other such directory, as discussed above. In some implementations, the backup manager or hash generator may calculate a hash of the contents of the identification file, and may use the hash result as the name of the identification file.

Storage of the identification file in the parent folder (or in an associated or linked hidden directory) may trigger a system event, write event, or other indication that the contents of the parent folder have changed. Accordingly, the method may repeat at step 400, with the identification file in place of the previously modified file. The identification file may, in some implementations, be backed up at step 402. In some implementations, a hash of the contents of the identification file may be calculated at step 406 and stored in a second identification file, to be stored in a further parent folder. Because the hash value of the identification file's contents is also its file name, the second identification file will explicitly identify the name of the first identification file in the child directory. In other, similar implementations, the file name of the first identification file may simply be appended to the second identification file, responsive to detection of a file type of the identification file indicating that it is an identification file, rather than a user data file. This may eliminate an extra hash calculation for each subfolder.

As discussed above, the method may repeat steps 400-412 for each parent folder until a root or top-level folder is reached. Thus, each identification file includes hash values that identify the versions of any user files in a child directory, plus any other identification files corresponding to further child directories of the child directory. The resulting tree may be quickly traversed to restore files to an identified time or version while maintaining the directory structure.

Figure 4B:
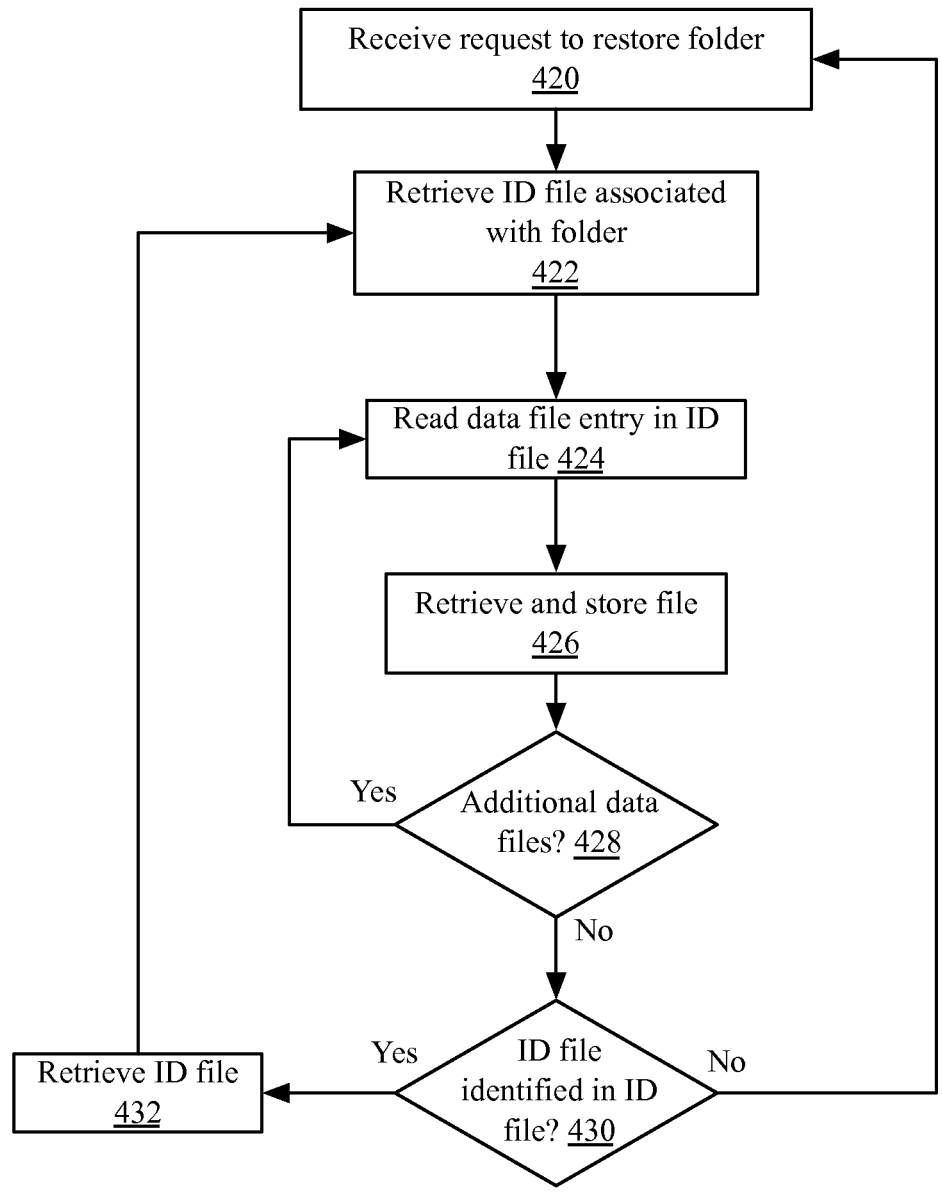
FIG. 4B is a flow diagram of an embodiment of a method for iterative restore of files and folders.

FIG. 4B is a flow diagram of an embodiment of a method for iterative restore of files and folders. The method may be referred to variously as an iterative restoration process, an incremental restore tracking process, a tree-based or hierarchical restore process, or by any other similar names. In many implementations, the method may be added to existing remote backup systems, as discussed above.

At step 420, a backup manager may receive a request to restore a folder and any subfolders to a previous state. In some implementations, the request may specify a restore time (e.g. "yesterday at 3 PM"), while in other implementations, the request may specify an identification file generated responsive to the file system entering the previous state, as discussed in the method of FIG. 4A. The request may be generated responsive to an input of a user via a user interface, such as selection of a time or date on a calendar or from a list of backup times and dates, or selection of a version of a file in the folder created at a prior time and date.

In implementations where the request does not explicitly identify an identification file, the backup manager may determine, from a list or database of identification files such as a backup database discussed above, an identification file for the folder corresponding to the selected time.

At step 422, the backup manager may retrieve the identification file associated with the selected folder. In many embodiments, the identification file associated with the selected folder may be stored in a parent folder of the selected folder. In some implementations, the backup manager may retrieve the identification file from a remote backup storage provider or remote storage location. In other implementations, the identification file may be available in local storage of the device, and the backup manager may retrieve the local copy of the identification file.

At step 424, the backup manager may read a first entry in the identification file. As discussed above, the entry may comprise a hash value corresponding to a version of a user data file. At step 426, the backup manager may retrieve the file corresponding to the entry in the identification file. In some implementations, the backup manager may retrieve the file from a remote storage provider or remote storage device. As discussed above, in some such implementations, the backup manager may request an encrypted file from the backup storage provider by storage location, starting block, ending block, and/or size, and thus not need to reveal any further metadata of the file. In one such implementation, the backup manager may obtain the required information from a backup database stored on the device. The backup manager may decrypt or decompress the file, if necessary, and may store the retrieved file in the folder.

At step 428, the backup manager may determine whether the identification file includes other data file entries. If so, steps 424-428 may be repeated for each other user data file identified in the first identification file.

At step 430, the backup manager may determine whether the identification file identifies any other identification files. As discussed above, the identification file may include a hash value (e.g. file name) of an identification file in a child directory. The backup manager may determine that an entry corresponds to an identification file based on metadata in the identification file, or metadata stored in a backup database at an index of the hash value.

If the identification file does not identify any other identification files, then no child folders or subfolders of the requested folder exist. Accordingly, in such implementations, the backup manager may indicate that the restore process is complete, and/or return to step 420. If the identification file does identify any other identification files (corresponding to one or more subfolders), then at step 432, the identified identification file or files may be retrieved, and the process may repeat steps 422-432 for each identified identification file and subfolder, as well as for any further identified subfolders. Accordingly, every file in a selected folder, as well as any subfolders of the file, will be restored to a version of the file present at a specified time. In some implementations, other files existing in a folder (such as files created subsequent to the restore point) may be removed, such that the folder is restored to the previous state; while in other implementations, such other files may not be removed, allowing the user to retrieve older versions of files without deleting subsequent work.

In some implementations, old or expired files may be removed from backup storage. For example, in one implementation, backed up files older than a predetermined age may be deleted by the backup storage provider to reduce storage costs. Identification files referencing the deleted files may be removed in such implementations to prevent the user from attempting to restore to an earlier time when the deleted files existed.

Figure 5A:
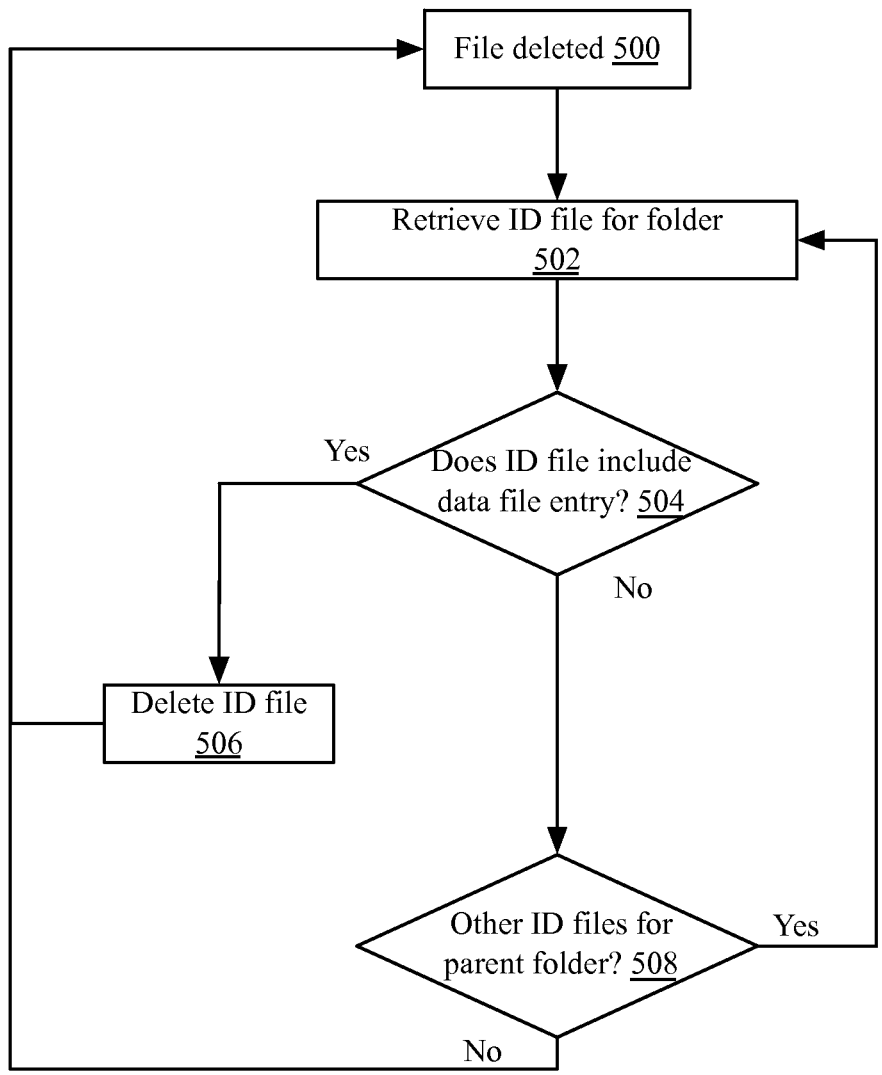
FIG. 5A is a flow diagram of an embodiment of a method for maintaining an iterative backup system.

FIG. 5A is a flow diagram of an embodiment of a method for maintaining an iterative backup system. At step 500, the backup manager may determine that a backed up file or version of the file has been deleted from backup storage. In some implementations, the backup manager may implicitly determine that the file or version of the file was deleted based on an age of the file, while in other implementations, the backup manager may explicitly determine that the file or version of the file was deleted in response to a deletion notification from the backup storage provider. In still other implementations, the backup manager may determine that a backed up version of a file or file should be deleted based on age of the file (and, in some implementations, lack of user interactions with or read requests directed to the file), and may transmit a request to delete the file or version of the file to the backup storage provider. In some implementations, the backup manager may retrieve a hash value for the deleted file or version of the file for use at step 504, while in other implementations, the backup manager may calculate a hash value of the deleted file or version of the file.

At step 502, responsive to deletion of the file or version of the file, the backup manager may retrieve an identification file for the folder that previously contained the deleted file or version of the file. As discussed above, the identification file may be stored in a parent folder of the folder, in a hidden directory, in a content addressing directory, or in any other such locations. In some implementations, the backup manager may retrieve an identification file explicitly associated with the folder that previously contained the deleted file or version of the file. In other implementations, the backup manager may simply retrieve a first identification file stored in or associated with the parent folder. In some such implementations, multiple identification files may exist in the parent folder, such as where the parent folder contains multiple child folders. Only one identification file of the multiple identification files will correspond to the child folder that previously contained the deleted file or version of the file. This may be detected at step 504, as discussed below.

At step 504, the backup manager may determine whether the retrieved identification file includes an entry including the hash value of the deleted file or version of the file. In some implementations in which the identification file retrieved at step 502 was explicitly associated with the folder that previously contained the deleted file or version of the file, the identification file will include the hash value of the deleted file or version of the file. In other implementations, such as where a first identification file of a plurality of identification files stored in or associated with the parent folder is retrieved, the first identification file may or may not include the hash value of the deleted file or version of the file, and the backup manager may make a determination accordingly.

If the identification file does include the hash value of the deleted file or version of the file, then at step 506, the backup manager may delete the retrieved identification file. If the identification file does not include the hash value of the deleted file or version of the file, then at step 508, the backup manager may determine if other identification files exist in the parent folder. Accordingly, in implementations in which the parent folder includes a plurality of child folders and a corresponding plurality of identification files, the backup manager may search through each identification file, repeating steps 502-508 until the identification file corresponding to the folder including the deleted file or version of the file is identified and deleted at step 506.

Figure 5B:
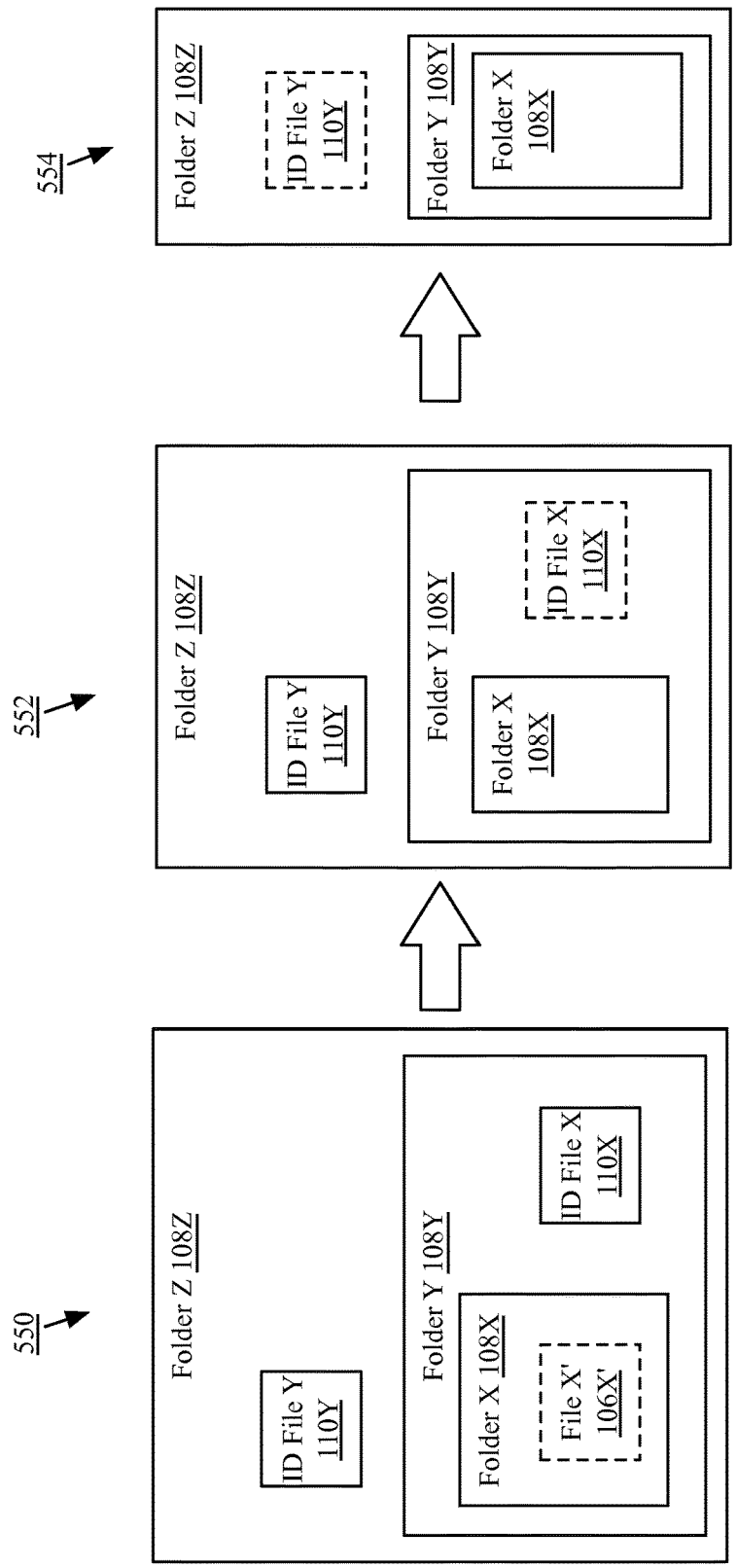
FIG. 5B is a diagram illustrating three exemplary states of a directory during an embodiment of an iterative maintenance process.

Deletion of the identification file at step 506 may trigger a repeat iteration of steps 500-508, with the deleted identification file in place of the previously deleted file. The iteration may repeat until reaching a top-level or root folder (at which point, the method may exit and wait for a next occurrence of file deletion). Accordingly, the backup manager will not only delete the aged or expired file or version of a file, but will also delete any identification file referring to the deleted file, and delete any identification file of a parent folder referring to a deleted identification file. For example, FIG. 5B is a diagram illustrating three exemplary states of a directory during an embodiment of an iterative maintenance process. At step 550, a version of a file X 106X' is deleted. At step 552, an identification file X 110X in the parent folder 108Y is deleted, responsive to the identification file 110X including an identification of file X' 106X' in folder X 108X. Deletion of identification file 110X triggers step 554, at which an identification file Y 110Y is deleted, responsive to the identification file Y 110Y including an identification of identification file X 110X.

Accordingly, as a result of the method illustrated in FIG. 5A and according to the example shown in FIG. 5B, the user will be unable to select to restore any folder to a time period including the deleted file or version of the file, as all of the corresponding identification files generated during that time period will have been deleted.

In a further implementation of the method of FIG. 5A, steps 502-508 may be repeated for one or more additional identification files for the folder including the deleted version of the file that were created at a time between creation of the version of the file and a current time. For example, if a first file was created three months ago, but was subsequently not modified while other files in the same directory or child directories were modified, identification files created two months ago, two weeks ago, or even in the last hour may include identifications of the first file. Accordingly, if the first file is deleted, but only the identification file from 3 months ago is deleted, in some implementations, the user may still attempt to restore the folder to a state from one week ago, at which point the first file existed. Because it has been deleted from the backup storage, this may not be possible. Accordingly, in such implementations, steps 502-508 may be repeated, iteratively for each identification file from the time of creation of the file (e.g. 3 months ago for the first file in the example above) to a present time. Any identification file including an identification of the deleted version of the file will thus also be deleted, removing any possibility of the user attempting to restore the deleted version of the file.

Figure 6:
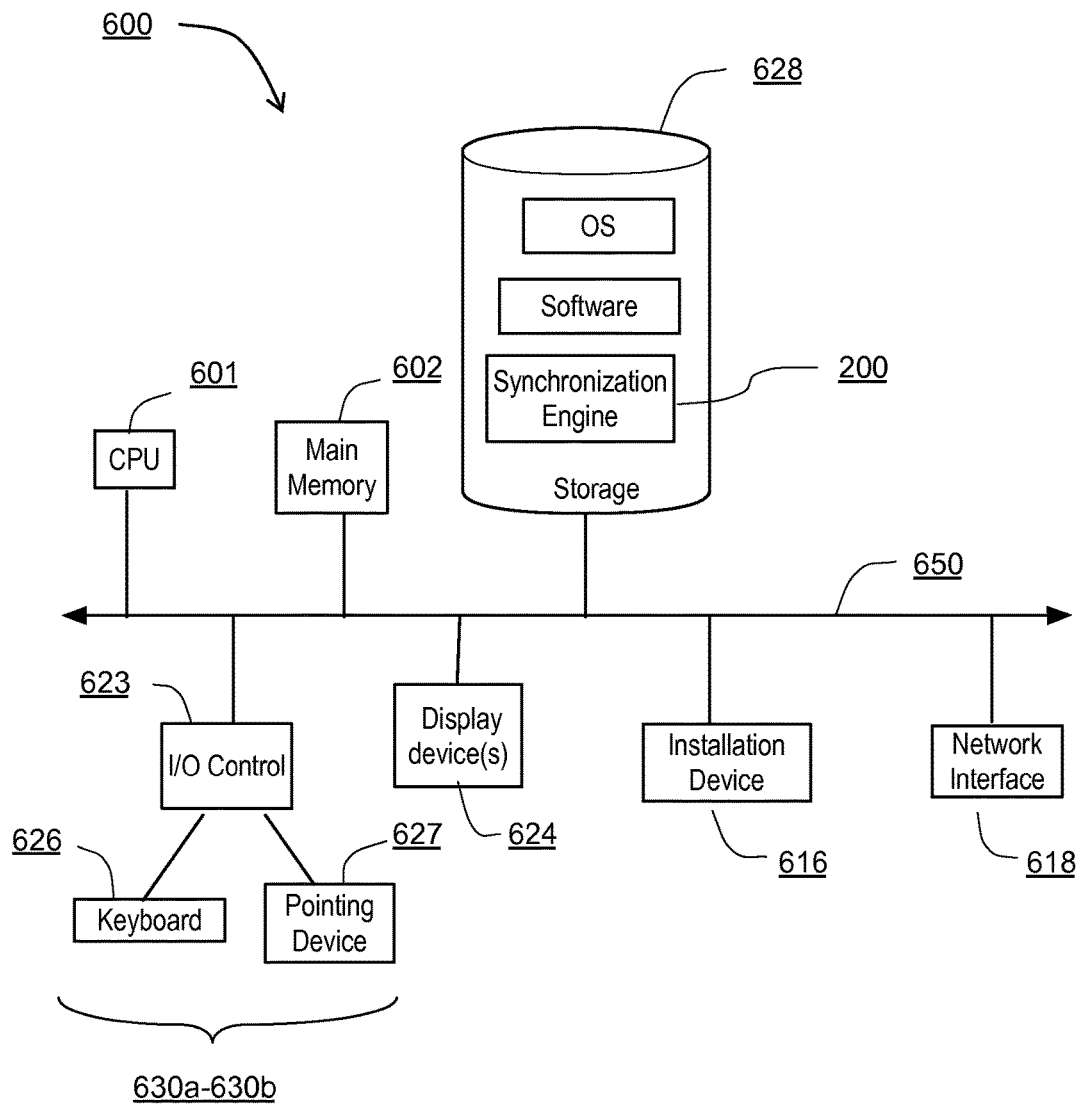
FIG. 6 is a block diagram of an exemplary computing device useful for practicing the methods and systems described herein.

FIG. 6 is a block diagram of an exemplary computing device useful for practicing the methods and systems described herein. The various devices 100, 114 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 6 depicts a block diagram of a computing device 600 useful for practicing an embodiment of the user devices 100 or device of an online storage or backup provider 114. A computing device 600 may include a central processing unit 601; a main memory unit 602; a visual display device 624; one or more input/output devices 630a-630b (generally referred to using reference numeral 630), such as a keyboard 626, which may be a virtual keyboard or a physical keyboard, and/or a pointing device 627, such as a mouse, touchpad, or capacitive or resistive single- or multi-touch input device; and a cache memory 640 in communication with the central processing unit 601.

The central processing unit 601 is any logic circuitry that responds to and processes instructions fetched from the main memory unit 602 and/or storage 628. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 602 may be one or more memory chips capable of storing data and allowing any storage location to be directly accessed by the microprocessor 601, such as random access memory (RAM) of any type. In some embodiments, main memory unit 602 may include cache memory or other types of memory.

The computing device 600 may support any suitable installation device 616, such as a floppy disk drive, a CD-ROM drive, a CD-R/RW drive, a DVD-ROM drive, tape drives of various formats, USB/Flash devices, a harddrive or any other device suitable for installing software and programs such as any client agent 620, or portion thereof. The computing device 600 may further comprise a storage device 628, such as one or more hard disk drives or redundant arrays of independent disks, for storing an operating system and other related software, and for storing application software programs such as any program related to the client agent 620.

Furthermore, the computing device 600 may include a network interface 618 to interface to a Local Area Network (LAN), Wide Area Network (WAN) or the Internet through a variety of connections including, but not limited to, standard telephone lines, LAN or WAN links (e.g., Ethernet, T1, T3, 56kb, X.25), broadband connections (e.g., ISDN, Frame Relay, ATM), wireless connections, (802.11a/b/g/n/ac, BlueTooth), cellular connections, or some combination of any or all of the above. The network interface 618 may comprise a built-in network adapter, network interface card, PCMCIA network card, card bus network adapter, wireless network adapter, USB network adapter, cellular modem or any other device suitable for interfacing the computing device 600 to any type of network capable of communication and performing the operations described herein.

A wide variety of I/O devices 630a-630n may be present in the computing device 600. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 630 may be controlled by an I/O controller 623 as shown in FIG. 6. The I/O controller may control one or more I/O devices such as a keyboard 626 and a pointing device 627, e.g., a mouse, optical pen, or multi-touch screen. Furthermore, an I/O device may also provide storage 628 and/or an installation medium 616 for the computing device

600. The computing device 600 may provide USB connections to receive handheld USB storage devices such as the USB Flash Drive line of devices manufactured by Twintech Industry, Inc. of Los Alamitos, Calif.

The computing device 600 may comprise or be connected to multiple display devices 624a-624n, which each may be of the same or different type and/or form. As such, any of the I/O devices 630a-630n and/or the I/O controller 623 may comprise any type and/or form of suitable hardware, software embodied on a tangible medium, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. A video adapter may comprise multiple connectors to interface to multiple display devices 624a-624n. The computing device 600 may include multiple video adapters, with each video adapter connected to one or more of the display devices 624a-624n. Any portion of the operating system of the computing device 600 may be configured for using multiple displays 624a-624n. Additionally, one or more of the display devices 624a-624n may be provided by one or more other computing devices, such as computing devices 600a and 600b connected to the computing device 600, for example, via a network. These embodiments may include any type of software embodied on a tangible medium designed and constructed to use another computer's display device as a second display device 624a for the computing device 600. One ordinarily skilled in the art will recognize and appreciate the various ways and embodiments that a computing device 600 may be configured to have multiple display devices 624a-624n.

A computing device 600 of the sort depicted in FIG. 6 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 600 may have different processors, operating systems, and input devices consistent with the device. For example, in one embodiment, the computer 600 is an Apple iPhone or Motorola Droid smart phone, or an Apple iPad or Samsung Galaxy Tab tablet computer, incorporating multi-input touch screens. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for tree-based remote incremental backup tracking, comprising:
    (a) detecting, by a backup manager executed by a local device, a detected file comprising a new or modified file in a first folder of the local device;
    (b) transmitting, to a remote device by the backup manager, the detected file for backup by the remote device, responsive to the detecting;
    (c) generating, by the backup manager, a first identification file associated with a first parent folder of the first folder by including in the first identification file a record of files, including the detected file, in the first folder at a particular point in time;
    (d) transmitting, to the remote device by the backup manager, the first identification file for backup by the remote device; and
    (e) iteratively repeating steps (a)-(d) for each successive parent folder up to a designated folder of the local device, wherein repeating the (c) generating further comprises generating an identification file associated with each successive parent folder, and wherein repeating the (c) generating further comprises producing a succession of identification files associated with descendent subfolders through to the first parent folder.

2. The method of claim 1, wherein the designated folder of the local device is a root folder.

3. The method of claim 1, wherein step (c) further comprises calculating a hash value of the detected file, and storing the hash value in the first identification file.

4. The method of claim 1, wherein the detecting the modified file comprises an identification of a current version of the modified file.

5. The method of claim 1, wherein the first identification file is associated with the first parent folder of the first folder as external metadata of the first parent folder.

6. The method of claim 1, wherein the first identification file is stored in the first parent folder of the first folder.

7. A method for restoring from a tree-based remote incremental backup comprising:

retrieving, by a backup manager executed by a local device, responsive to a selection of a first folder of the local device for restoration to an indicated time, a first identification file associated with the first folder, the first identification file identifying a version of a first file stored in the first folder at the indicated time, the first identification file comprising a record of files, including the first file, in the first folder at the indicated time, and the first identification file being associated with a parent folder of the first folder;

reading, by the backup manager from the first identification file, an identification of the version of the first file, the first file comprising a second identification file associated with a child folder of the first folder;

retrieving, by the backup manager, based on the identification of the version of the first file, the second identification file;

reading, by the backup manager from the second identification file, an identification of the version of the second identification file; and iteratively repeating retrieving and reading a succession of identification files associated with descendent subfolders of the first folder through to a retrieved file that is other than an identification file.

8. The method of claim 7, wherein the first file comprises a user data file.

9. A method for maintaining a tree-based remote incremental backup tracking system, comprising:
(a) receiving, by a backup manager executed by a local device, an identification of deletion of a version of a backed up file having a first modification time from a first folder of the local device;
(b) retrieving, by the backup manager, identification files associated with versions of a parent folder of corresponding versions of the first folder, each said identification files identifying contents of a corresponding version of the first folder at times in a range from the first modification time to a current time, each of the identification files comprising a record of files, including versions of the backed up file, in the first folder at said times in said range;
(c) identifying, by the backup manager, a subset of the identification files including an identification of the version of the backed up file having the first modification time;
(d) deleting, by the backup manager, the subset of the identification files; and
(e) iterating steps (a)-(d) for each deleted identification file for successive parent folders up to a designated folder, wherein iterating the (d) deleting further comprises deleting a succession of identification files associated with the successive parent folders through to the designated folder.

10. The method of claim 9, wherein each of the identification files is stored in a folder corresponding to a version of a parent folder of the first folder.

11. The method of claim 9, wherein identifying a subset of the identification files including an identification of the version of the backed up file having the first modification time further comprises:
calculating a hash result of contents of the version of the backed up file having the first modification time; and
identifying at least one of the identification files including the hash result.

12. A system for tree-based remote incremental backup tracking, comprising:
a local device comprising a processor and a memory storing a file system, the processor executing a backup manager configured to:
(a) detect a detected file comprising a new or modified file in a first folder of the file system of the local device;
(b) transmit, to a remote device, the detected file for backup by the remote device, responsive to detection of the detected file;
(c) generate a first identification file associated with a first parent folder of the first folder in the file system of the local device by including in the first identification file a record of files, including the detected file, in the first folder at a particular point in time;
(d) transmit, to the remote device, the first identification file for backup by the remote device; and
(e) iteratively repeat steps (a)-(d) for each successive parent folder up to a designated folder of the local device, wherein repeating the (c) generate further comprises generating an identification file associated with each successive parent folder, and wherein repeating the (c) generate further comprises producing a succession of identification files associated with descendent subfolders through to the first parent folder.

13. The system of claim 12, wherein the designated folder of the local device is a root folder.

14. The system of claim 12, wherein the backup manager is configured to calculate a hash value of the detected file, and store the hash value in the first identification file.

15. The system of claim 12, wherein detecting the modified file comprises an identification of a current version of the modified file.

16. The system of claim 12, wherein the first identification file is associated with the first parent folder of the first folder as external metadata of the first parent folder.

17. The system of claim 12, wherein the first identification file is stored in the first parent folder of the first folder.

* * * * *